United States Patent
Basu Mallick et al.

(10) Patent No.: US 11,616,768 B2
(45) Date of Patent: Mar. 28, 2023

(54) METHOD AND APPARATUS FOR HANDLING SECURITY KEYS FOR INDIVIDUAL BEARERS

(71) Applicant: Motorola Mobility LLC, Chicago, IL (US)

(72) Inventors: Prateek Basu Mallick, Langen (DE); Andreas Kunz, Ladenburg (DE); Joachim Löhr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 809 days.

(21) Appl. No.: 16/016,588

(22) Filed: Jun. 23, 2018

(65) Prior Publication Data
US 2018/0376330 A1 Dec. 27, 2018

Related U.S. Application Data

(60) Provisional application No. 62/524,304, filed on Jun. 23, 2017.

(51) Int. Cl.
*H04L 9/40* (2022.01)
*H04W 12/041* (2021.01)
*H04W 12/0433* (2021.01)
*H04W 88/06* (2009.01)

(52) U.S. Cl.
CPC ........... *H04L 63/06* (2013.01); *H04W 12/041* (2021.01); *H04W 12/0433* (2021.01); *H04L 2463/061* (2013.01); *H04W 88/06* (2013.01)

(58) Field of Classification Search
CPC ............... H04W 12/04; H04W 12/041; H04W 12/0433; H04W 88/06; H04L 63/06; H04L 2463/061
(Continued)

(56) References Cited

U.S. PATENT DOCUMENTS 5,832,086 A * 11/1998 Rosauer .................. H04L 9/083
380/273
2006/0029226 A1* 2/2006 Han ...................... H04L 9/0822
380/44

(Continued)

FOREIGN PATENT DOCUMENTS

EP          2922326 A1     9/2015
WO       2015066406 A2     5/2015

OTHER PUBLICATIONS

3GPP TS 36331-e10, 3rd Generation Partnership Project, Technical Specification Group Radio Access Network, Evolved Universal Terrestrial Radio Access (E-UTRA), Radio Resource Control (RRC); Protocol specification (Release 14).

(Continued)

*Primary Examiner* — Jacob Lipman
(74) *Attorney, Agent, or Firm* — Loppnow & Chapa

(57) ABSTRACT

A method and apparatus for handling security keys for individual bearers of the user equipment include dividing between a plurality of different sub-groups, a plurality of individual bearers, each sub-group having a different base value from which the security keys for the associated bearers are derived. When the security keys associated with the individual bearers of one particular sub-group are refreshed, the security keys of the individual bearers, which are not a part of the particular sub-group do not need to be refreshed.

20 Claims, 16 Drawing Sheets

(58) Field of Classification Search
USPC .......................................................... 726/3
See application file for complete search history.

(56) References Cited

U.S. PATENT DOCUMENTS

2014/0140511 A1\* 5/2014 Suh ...................... H04L 9/0836
380/273
2016/0029213 A1 1/2016 Rajadurai et al.
2016/0065362 A1\* 3/2016 Choyi ................... H04L 63/065
380/279

OTHER PUBLICATIONS

3GPP TS 33401-e10, V14.1.0 (Dec. 2016), 3rd Generation Partnership Project, Technical Specification Group Services and System Aspects; 3GPP System Architecture Evolution (SAE); Security architecture (Release 14).
3GPP TS 36323-e10, V14.1.0 (Dec. 2016), 3rd Generation Partnership Project, Technical Specification Group Radio Access Network; Evolved Universal Terrestrial Radio Access (E-UTRA); Packet Data Convergence Protocol (PDCP) specification (Release 14).
PCT International Search Report for PCT/US2018/039181, Motorola Mobility LLC, dated Sep. 20, 2018.
3GPP TS 36.300 V14.2.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description; Stage 2 (Release 14).

\* cited by examiner

*1200*

| ALGORITHM DISTINGUISHER | VALUE |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

METHOD AND APPARATUS FOR HANDLING SECURITY KEYS FOR INDIVIDUAL BEARERS

FIELD OF THE INVENTION

The present disclosure is directed to a method and apparatus for handling security keys for individual bearers, and more particularly to the grouping of bearers and the manner in which keys are assigned to each group.

BACKGROUND OF THE INVENTION

Presently, user equipment, such as wireless communication devices, communicate with other communication devices using wireless signals. To facilitate the communication, the wireless signals are often broadcast to an area in which the intended communication partner, as well as other observers of the wireless signals may be present. It is generally desirable for only the intended parties of the communication to be able to discern the information that is being conveyed. So, the information itself is often at least sometimes encrypted, where the keys to the decryption are generally only known to the sender and the intended recipient of the communication.

Some wireless communication devices will maintain multiple connections and/or communication channels with one or more communication targets. This may be the result of the presence and operation of one or more user applications within the device, that may each require the ability to transmit or receive information. In turn this can result in multiple bearers being created and maintained in a particular device, which each may require one or more forms of security in order to insure the privacy and/or integrity of the information being conveyed. In many wireless environments, a communication connection may be managed relative to a communication standard, which defines the details that must be agreed upon and understood to facilitate a more seamless connection. These agreed upon details will often include the details related to the security of the wireless communications. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In some instances, a wireless communication device may be currently connected to one or more communication targets using multiple different standards. Still further, some communication connections may involve multiple types of networks via which data related to the connection can be conveyed, where each network can have its own standard. In at least some instances, this may be referred to as dual connectivity. Even with some forms of dual connectivity, a particular communication connection may be focused more exclusively with a connection to a particular one of the multiple types of networks. In other instances, a communication connection may route information through multiple networks. In each of these and other instances an understanding as to how the security will be managed for each of the bearers can be important. Some systems may attempt to use the same manner of security for all communication bearers associated with a particular wireless communication device. Other systems may apply and manage a different form of security relative to each different communication bearer. Whichever manner is selected has the potential to impact different aspects of the communication connection differently, including if and when the security keys associated with a particular bearer might need to be refreshed.

The present inventors have recognized, that it may be beneficial to divide a plurality of individual bearers between a plurality of different sub-groups, where each sub-group has a different base value from which the security keys for the associated bearers are derived, such that when the security keys associated with the individual bearers of one particular sub-group are refreshed, the security keys of the individual bearers, which are not a part of the particular sub-group do not need to be refreshed.

SUMMARY

Presently, user equipment, such as wireless communication devices, communicate with other communication devices using wireless signals. According to a possible embodiment, a method in a user equipment for handling security keys for individual bearers of the user equipment is provided. The method includes dividing between a plurality of different sub-groups, a plurality of individual bearers, each sub-group having a different base value from which the security keys for the associated bearers are derived. When the security keys associated with the individual bearers of one particular sub-group are refreshed, the security keys of the individual bearers, which are not a part of the particular sub-group do not need to be refreshed.

In some embodiments, the plurality of different sub-groups include bearers which distinguish between a type of connectivity between multiple networks which is supported by the bearer including a master cell group bearer supporting connectivity with a master cell, a secondary cell group bearer supporting connectivity with a secondary cell, and a split cell group bearer supporting connectivity with both the master cell and the secondary cell.

In some embodiments, the method can further include creating security keys for each of the plurality of individual bearers, based upon the base value of the sub-group to which the individual bearer is associated. The corresponding security keys are used in support of the conveyance of information between each of the individual bearers and one or more of multiple networks. The need for a refresh of the security keys is detected relative to at least one of the individual bearers, which is associated with one of the plurality of different sub-groups. The security keys are refreshed for each of the individual bearers associated with the one of the plurality of different sub-groups, wherein the security keys of the individual bearers, which are not part of the one of the plurality of different sub-groups are not refreshed.

According to a possible embodiment, a user equipment having dual connectivity with at least a pair of communication networks is provided. The user equipment includes a controller that establishes a plurality of individual bearers and organizes them between a plurality of different sub-groups, each sub-group having a different base value from which security keys for the associated bearers are derived. When the security keys associated with the individual bearers of one particular sub-group are refreshed, the security keys of the individual bearers, which are not a part of the particular sub-group do not need to be refreshed.

In some embodiments, the user equipment can further include a transceiver that uses the corresponding security keys in support of the conveyance of information between each of the individual bearers and one or more of multiple networks. In some of these instances, the transceiver can convey to at least one of the at least pair of communication networks parameter values used to create the security keys for each of the bearers.

According to a possible embodiment, a method in a network entity for handling security keys for use with individual bearers of the user equipment is provided. The method includes dividing between a plurality of different sub-groups, a plurality of individual bearers, each sub-group having a different base value from which the security keys for the associated bearers are derived. When the security keys associated with the individual bearers of one particular sub-group are refreshed, the security keys of the individual bearers, which are not a part of the particular sub-group do not need to be refreshed.

According to a possible embodiment, a network entity supporting dual connectivity between a user equipment and at least a pair of communication networks is provided. The network entity includes a controller that manages communication via a plurality of individual bearers of the user equipment and organizes them between a plurality of different sub-groups, each sub-group having a different base value from which security keys for the associated bearers are derived. When the security keys associated with the individual bearers of one particular sub-group are refreshed, the security keys of the individual bearers, which are not a part of the particular sub-group do not need to be refreshed.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
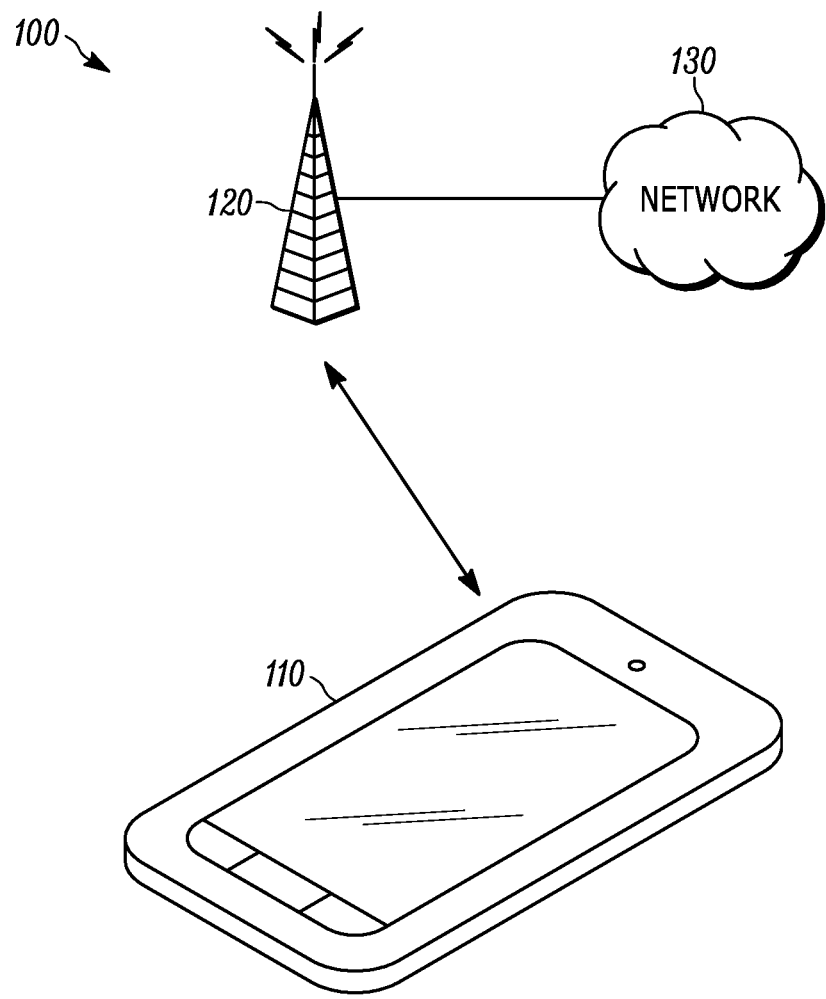
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for handling security keys for individual bearers.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In 5G NR system, for Evolved Universal Mobile Telecommunications System Terrestrial Radio Access Network New Radio Access Technology (E-UTRA NR) Dual Connectivity (called ENDC) the following bearer types are supported: Master Cell Group (MCG) bearer, Secondary Cell Group (SCG) bearer, MCG split bearer and SCG split bearer. Radio layer 2 and Radio Layer 3 (RAN2) discussed recently the possibility to unify the different split bearer types. The final objective of unifying the split bearers should be such that from RAN2 UE specification perspective, there is only one split bearer type, both from the control and user plane perspective. The aim of the bearer unification is to minimise the changes between MCG split bearer and SCG split bearer in order to reduce the standardization, implementation and testing effort and minimize the risk of market fragmentation. It has been proposed to introduce a security key per radio bearer compared to LTE where one security key is used for all radio bearers of cell group (eNB). The benefits of a security key per radio bearer include Key isolation (from other bearers of same or different Slice), making the network architecture, in particular the Packet Data Convergence Protocol (PDCP) location, transparent to the UE and also the key refresh for one Bearer shall not impact other Bearers.

In LTE the Access Stratum (AS) applies three different security keys: one for the integrity protection of Radio Resource Control (RRC) signaling ($K_{RRCint}$), one for the ciphering of RRC signaling ($K_{RRCenc}$) and one for the ciphering of user data ($K_{UPenc}$). All three AS keys are derived from the $K_{eNB}$ key. The $K_{eNB}$ is based on the $K_{ASME}$ key, which is handled by upper layers.

Now in 5G, there is no current description on how the key handling shall be performed for unified split bearer(s) and it is unclear how the key isolation is achieved and the key refresh can be performed for a particular bearer only, e.g. for the MCG bearer, SCG bearer or for the split bearer.

Figure 2:
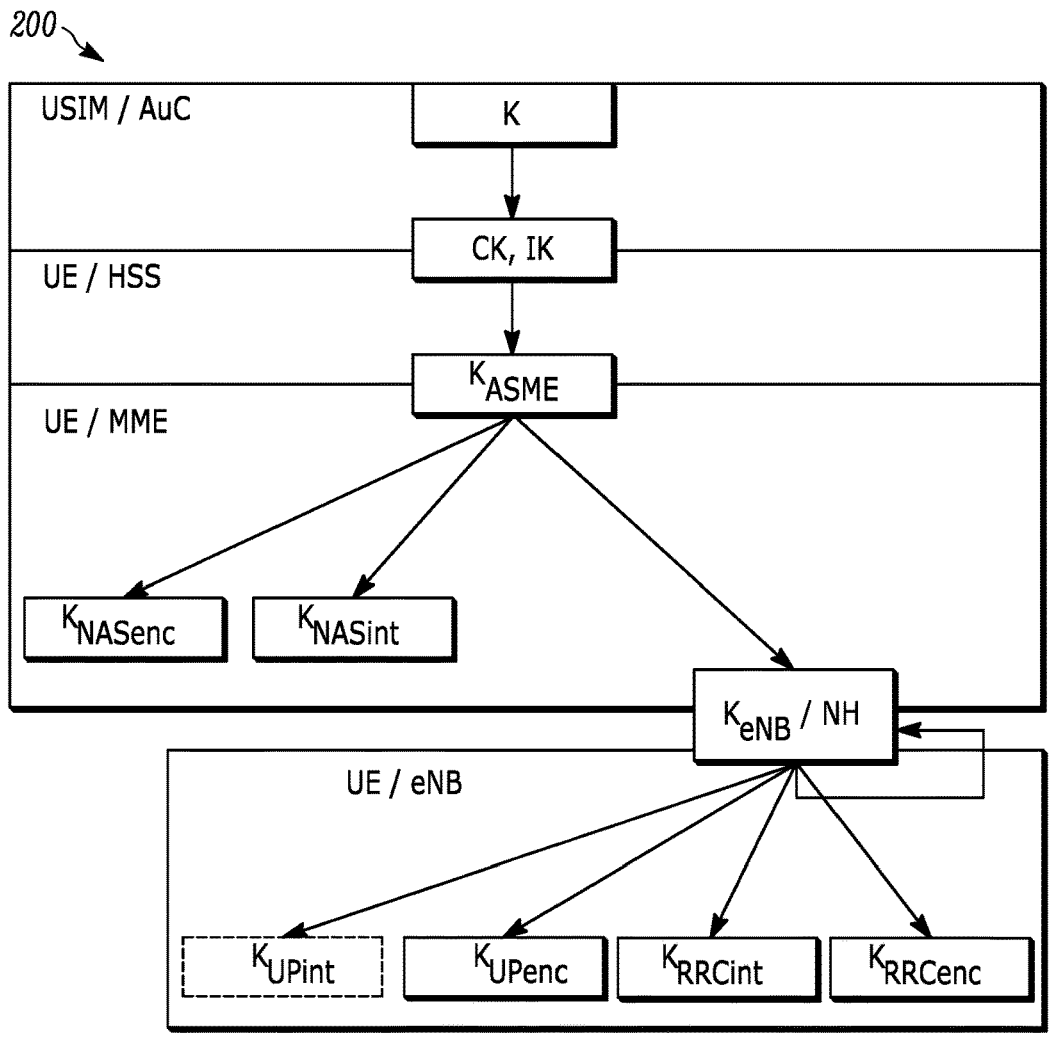
FIG. 2 is a block diagram of the key hierarchy in an exemplary system, such as an Evolved Universal Mobile Telecommunications System Terrestrial Radio Access Network (E-UTRAN)/Enhanced Packet Core (EPC) system.

The key hierarchy in E-UTRAN/EPC system is shown in FIG. 2. FIG. 2 illustrates a block diagram 200 of the key hierarchy in an exemplary system, such as an Evolved Universal Mobile Telecommunications System Terrestrial Radio Access Network (E-UTRAN)/Enhanced Packet Core (EPC) system.

Keys are required for ciphering and integrity protection of user data in the access stratum. The Key Hierarchy in E-UTRAN did not have keys for Integrity Protection of User Data and therefore no $K_{UPint}$ can be seen in the Figure. However, in 5G NR, Third Generation Partnership Project (3GPP) Security and Privacy in 3GPP systems (SA3) is considering to also integrity protect the user plane data. Therefore, there may be five AS keys ($K_{eNB}$, $K_{RRCint}$, $K_{RRCenc}$ and $K_{UPenc}$, $K_{UPint}$) in 5G NR system.

As can be seen from the Hierarchy figure, keys ($K_{RRCint}$, $K_{RRCenc}$ and $K_{UPenc}$, $K_{UPint}$) are derived from $K_{eNB}$. $K_{eNB}$ key is derived from $K_{ASME}$. The name of the different keys here are directly taken from E-UTRAN (3GPP TS 36331-e10 and 3GPP TS 33401-e10) and likely the name of the keys and their derivation input parameters are different in 5G NR. However, this disclosure still uses these terms to bring out the essence of the concepts being presently discussed.

This disclosure still talks about eNB instead of gNB in 5G NR system merely to maintain consistency and just to exemplify their relationship in 5G NR system. The disclosure is valid for 5G system with 5G RAN connected to 5GC or to Enhanced Packet Core (EPC) as well as to enhanced E-UTRAN connected to 5G Core (5GC). In this respect, for example the ultimate keys (i.e. the end keys in the key hierarchy; $K_{RRCint}$, $K_{RRCenc}$ and $K_{UPenc}$, $K_{UPint}$) in 5G NR shall be derived from the penultimate keys in the 5G NR system (referred correspondingly here as $K_{eNB}$ for explanation), which in turn may be derived from keys one level up and so on. So, the names used here will correspond to the keys from a Bottom-up approach.

Figure 3A:
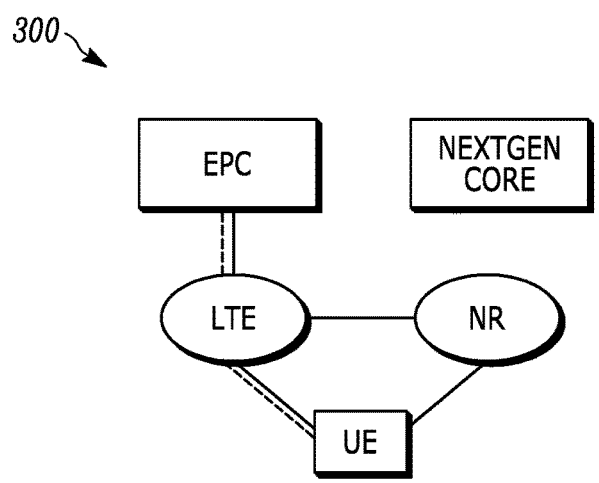
FIGS. 3A and 3B are each block diagrams of interworking scenarios for exemplary split bearers involving a pair of exemplary networks, such as an LTE network and a 5G new radio network, where the evolved Node B (eNB) of the LTE network is acting as the master.
Figure 3B:
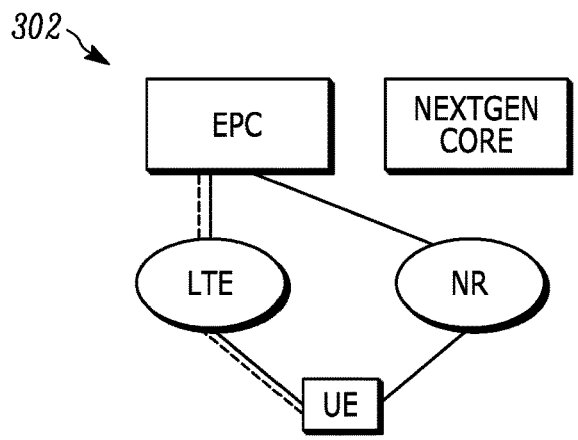

The following description is related to the migration and interworking scenario known as "option 3", where the eNB is acting as the Master eNB like for the Dual Connectivity feature. Two variants of option 3 are depicted in FIGS. 3A and 3B. FIGS. 3A and 3B each illustrate block diagrams 300 and 302 of interworking scenarios for exemplary split bearers involving a pair of exemplary networks, such as an LTE network and a 5G new radio network, where the evolved Node B (eNB) of the LTE network is acting as the master.

Figure 4A:
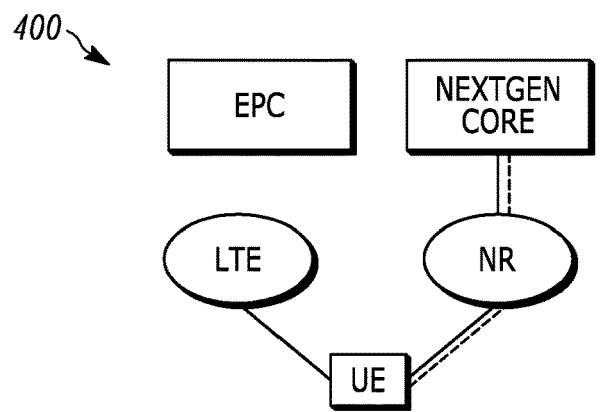
FIGS. 4A and 4B are each block diagrams of interworking scenarios for exemplary split bearers involving a pair of exemplary networks, such as an LTE network and a 5G new radio network, where the 5G Node B (gNB) of the 5G new radio network is acting as the master.
Figure 4B:
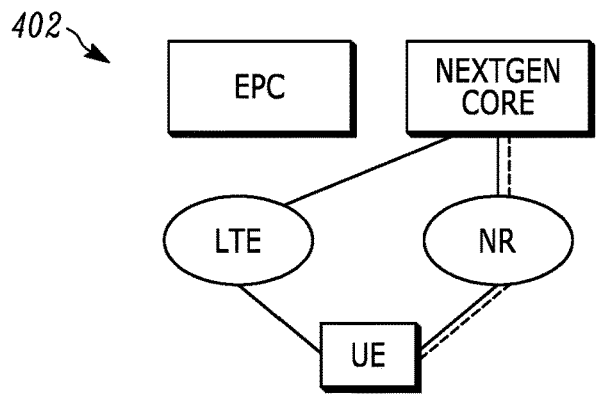
Figure 5:
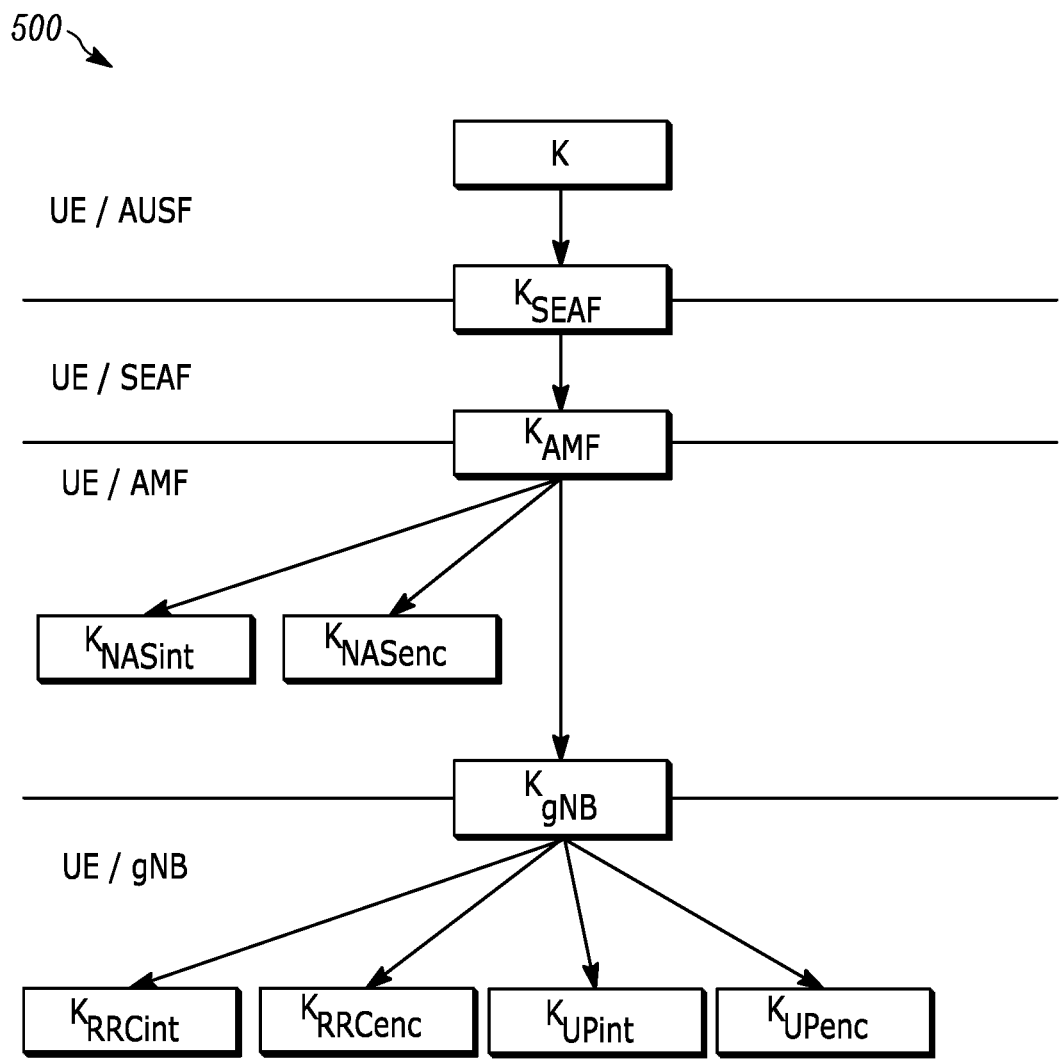
FIG. 5 is a block diagram of the key hierarchy in an exemplary system, which involves the nextGen Core of a 5G new radio network acting as the master.

It is also possible to consider the solution described in this document for further interworking scenarios, where the New Radio (NR) is acting as the Master Cell, also known and "option 4", depicted in FIGS. 4A and 4B. FIGS. 4A and 4B each illustrate block diagrams 400 and 402 of interworking scenarios for exemplary split bearers involving a pair of exemplary networks, such as an LTE network and a 5G new radio network, where the 5G Node B (gNB) of the 5G new radio network is acting as the master. There are in addition, other interworking and migration scenarios that could also apply, such as simply using $K_{gNB}$ instead of the $K_{eNB}$. The key hierarchy of the 5G system related to this solution is shown in FIG. 5. FIG. 5 illustrates a block diagram 500 of the key hierarchy in an exemplary system, which involves the nextGen Core of a 5G new radio network acting as the master.

Further, as explained earlier, 3GPP RAN2 is aiming to reduce the number of bearer types in 5G NR system. The aim of the bearer unification is to minimise changes between MCG split bearer and SCG split bearer in order to reduce the standardization, implementation and testing effort and reduce and/or minimize the risk of market fragmentation. For realizing this possibility, keys per Bearer are proposed and also a method to refresh the keys for one bearer at a time is proposed as well. In this respect, the term "bearer" applies not only to a data radio bearer but also to a signalling radio bearer (SRB). Per SRB keys might be required since in 5G NR system at least one SRB might also be configured in the secondary cell group side i.e. possibly in a different PDCP location. So, the teachings of the present disclosure here apply not only to DRBs but also to SRBs.

In the following the term eNB/gNB is used for the base station but it is replaceable by any other radio access node, e.g. Base Station (BS), eNB, gNB, Access Point (AP), NR etc. Further the proposed method is applicable also to other types of networks including 5th generation new radio access technology (NR), IEEE 802.11 variants, GSM, General Packet Radio Service (GPRS), Universal Mobile Telecommunications System (UMTS), LTE variants, Code Division Multiple Access (CDMA) 2000, Bluetooth, ZigBee, Sigfoxx, etc.

Derivation of Per Bearer Keys

For per bearer key, the AS key pair ($K_{UPint-i}$, and $K_{UPenc-i}$) for user plane data and possibly also for SRBs ($K_{RRCint-j}$, $K_{RRCenc-j}$) needs to be derived for each bearer; where T and T are bearer IDs for DRB and SRB and may take integer values starting from '0'. There are many ways of deriving the per bearer keys as described below:

1. Multiple $K_{eNB}$ Derivation

In multiple $K_{eNB}$ derivation, multiple $K_{eNB}$s are used possibly even inside the same cell group. Multiple $K_{eNB}$ derivation can have following variants:

1) Each Bearer (regardless of signaling radio bearer or data radio bearer) can have a separate $K_{eNB}$ from which the specific keys ($K_{RRCint-j}$, $K_{RRCenc-j}$ for SRB-j and $K_{UPint-i}$, $K_{UPenc-i}$ for DRBs) are derived. If there is another new data bearer to be added, it will get a new $K_{eNB}$ of its own and derive the further UP keys from it. This variant keeps the impacts limited to a specific bearer when only the keys for this specific bearer need to be refreshed.

Figure 6:
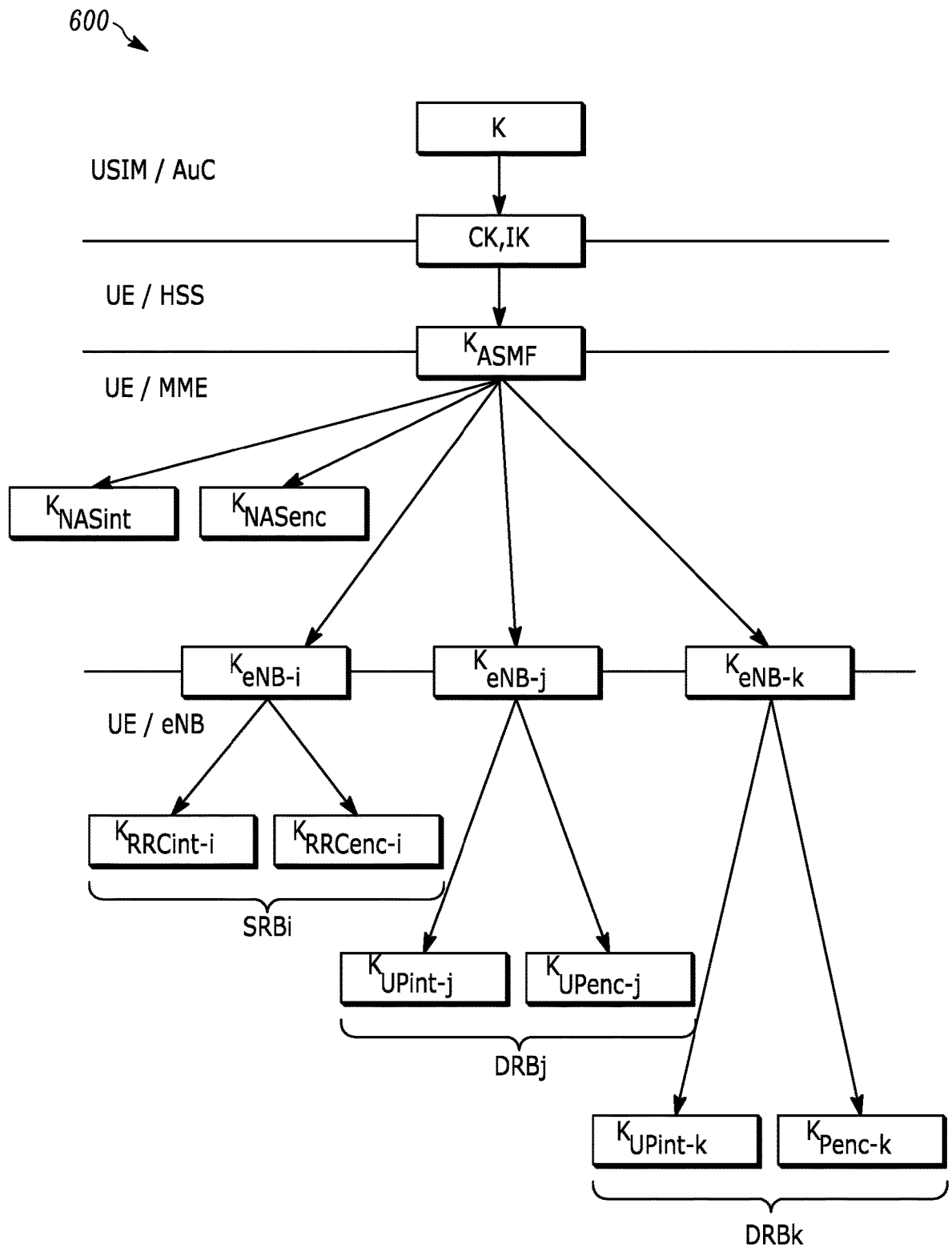
FIG. 6 is a block diagram of a key hierarchy in accordance with at least one embodiment of the present application involving the derivation of multiple Key $(K)_{eNB}$, where each bearer has a separate $K_{eNB}$.

FIG. 6 illustrates a block diagram 600 of a key hierarchy in accordance with at least one embodiment of the present application involving the derivation of multiple Key $(K)_{eNB}$, where each bearer has a separate $K_{eNB}$.

2) Only 3 $K_{eNB}$ are used: a first one for MCG bearer(s), a second one for SCG bearer(s) and a third one for Split bearer(s)—and therefore as an example, it is possible to only refresh the $K_{eNB}$ for Split bearer(s); or just for SCG bearer(s). So, if there is a COUNT wrap-around in one of the Bearer, as explained further below, and if this is a SCG bearer then $K_{eNB}$ for SCG bearer(s) can be refreshed and this affects (e.g. layer to re-establishment, Reset, buffer flushing etc.) all SCG bearers. Further, if there is another new data bearer to be added, it will use the UP keys of the corresponding type among the 3 types.

Figure 7:
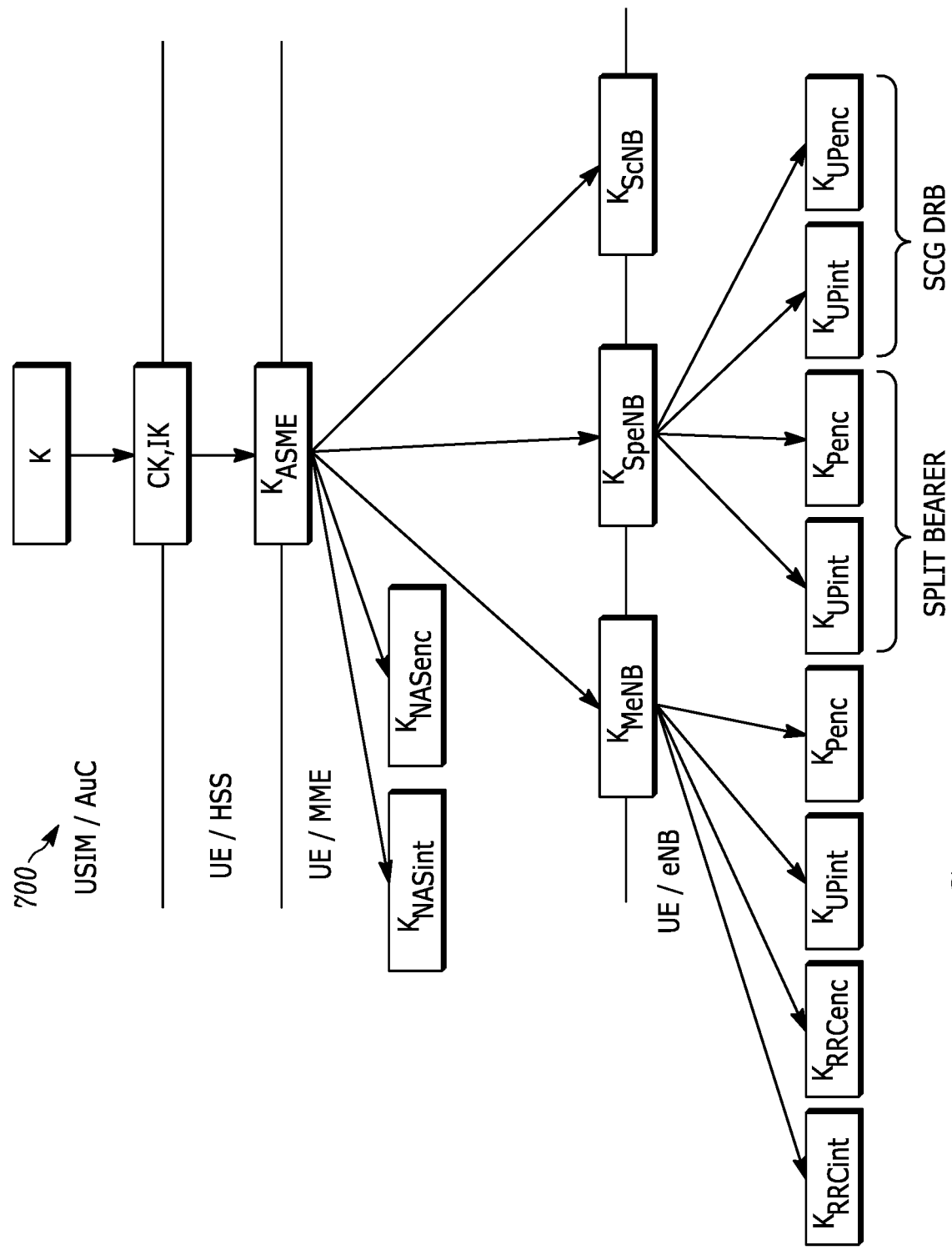
FIG. 7 is a block diagram of a key hierarchy in accordance with at least one embodiment of the present application involving the derivation of multiple $K_{eNB}$, where each $K_{eNB}$ is associated with a bearer having a different type of connectivity between multiple networks.

FIG. 7 illustrates a block diagram 700 of a key hierarchy in accordance with at least one embodiment of the present application involving the derivation of multiple $K_{eNB}$, where each $K_{eNB}$ is associated with a bearer having a different type of connectivity between multiple networks;

3) This variant is similar to the above variant except that $K_{eNB}$s are separately used for Control Plane (e.g. SRBs) and Data Plane (DRBs). So, it could lead to 6 $K_{eNB}$s such that 3 $K_{eNB}$s for SRBs depending on if this is a MCG SRB (e.g. SRB1 and SRB2 in 3GPP TS 36331-e10), or SCG SRB or even a Split SRB; and another 3 $K_{eNB}$s for DRBs depending on if this is a MCG DRB, or SCG DRB or Split DRB.

Figure 8:
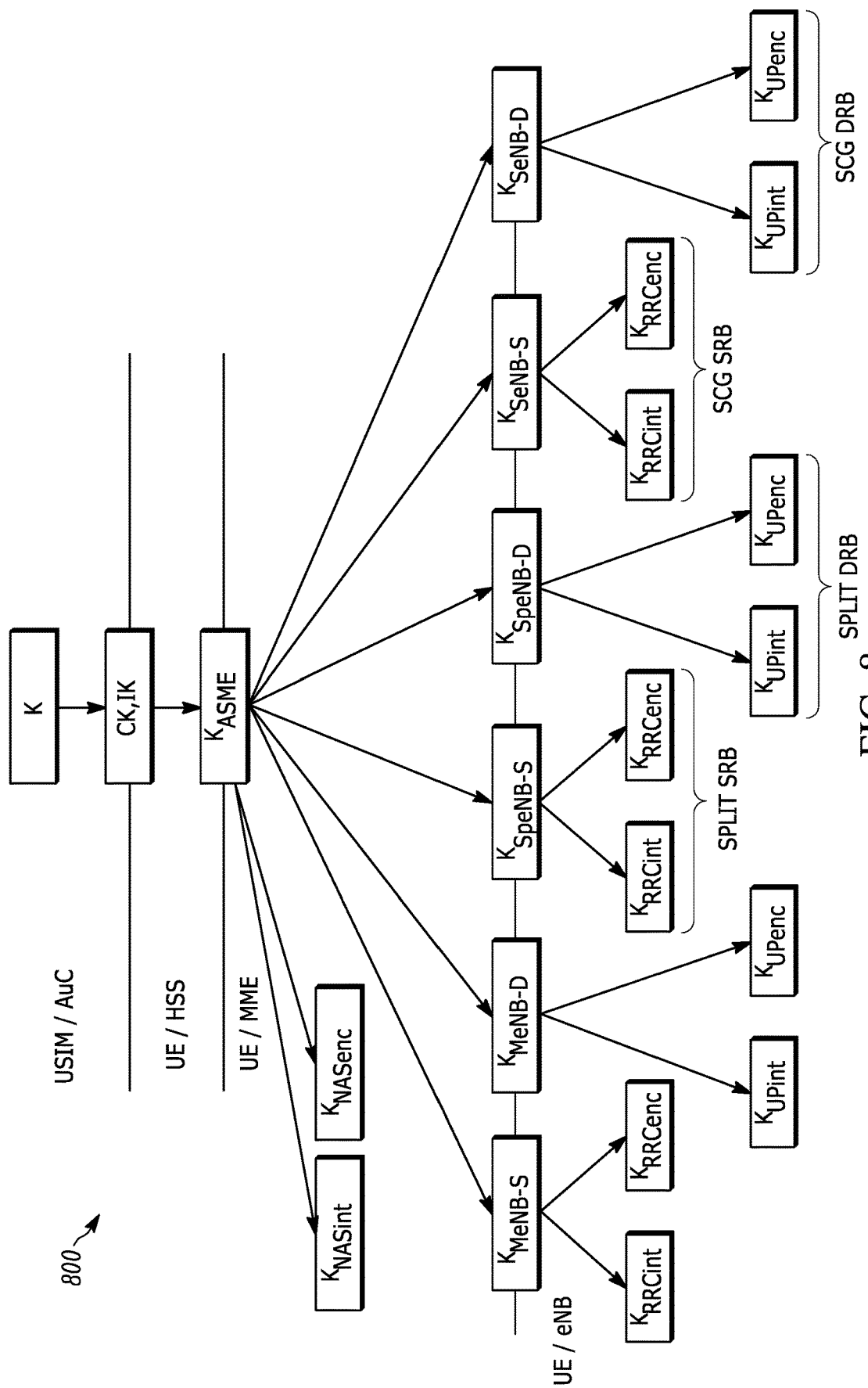
FIG. 8 is a block diagram of a key hierarchy in accordance with at least one embodiment of the present application involving the derivation of multiple $K_{eNB}$, where each $K_{eNB}$ is associated with a bearer having a different type of connectivity between multiple networks, as well as distinguish between the type of information being conveyed (i.e. data or signaling)

FIG. 8 illustrates a block diagram 800 of a key hierarchy in accordance with at least one embodiment of the present application involving the derivation of multiple $K_{eNB}$, where each $K_{eNB}$ is associated with a bearer having a different type of connectivity between multiple networks, as well as distinguish between the type of information being conveyed (i.e. data or signaling).

4) In another variant, where MCG bearer and SCG bearer are not separately indicated i.e. bearers are of only 2 types—DRBs AND Split-DRBs, only two $K_{eNB}$s are derived; one for DRBs and another for Split-DRBs. If the signaling and data bearer differentiation is to be made, then 4 KeNBs can be derived where 2 are for DRBs (DRB and Split-DRB) and another 2 are for SRBs (SRB and Split-SRB).

Figure 9:
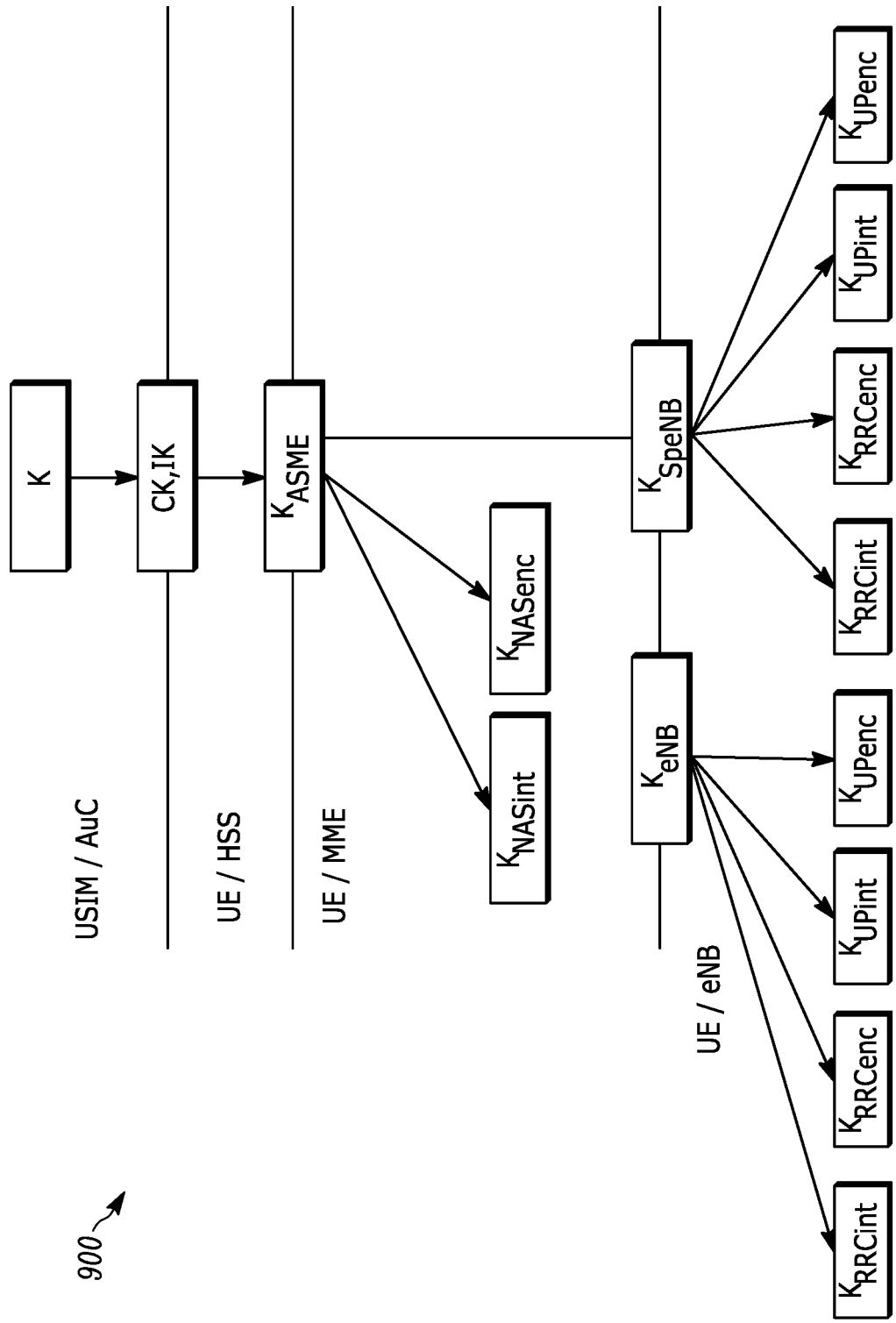
FIG. 9 is a block diagram of a key hierarchy in accordance with at least one embodiment of the present application involving the derivation of multiple $K_{eNB}$, where each $K_{eNB}$ is separately associated with non-split bearer and split bearers, as well as potentially distinguishing between the type of information being conveyed.

FIG. 9 illustrates a block diagram 900 of a key hierarchy in accordance with at least one embodiment of the present application involving the derivation of multiple $K_{eNB}$, where each $K_{eNB}$ is separately associated with non-split bearer and split bearers, as well as potentially distinguishing between the type of information being conveyed.

Multiple $K_{eNB}$ derivation can be done in two ways—Horizontal derivation and Vertical derivation depending on whether spare [Next Hop (NH), Next Hop Chaining Counter (NCC)] pair(s) are available or not. The UE and the eNB (actually a gNB in 5G NR) use the per-bearer $K_{eNBi}$ to secure the communication between each other for each of the bearer T. For the next bearer 'i+1' to be added, the basis for the $K_{eNBi+1}$ that will be used between the UE and the target eNB, called $K_{eNBi+1}$*, is derived from either the currently active Base $K_{eNB}$ or from $K_{eNBi}$ or from the NH parameter. If $K_{eNB}$* is derived from the currently active Base $K_{eNB}$ or from $K_{eNBi}$, this is referred to as a horizontal key derivation, and if the $K_{eNB}$* is derived from the NH parameter, the derivation is referred to as a vertical key derivation. On bearer addition with vertical key derivation, the NH is further bound to a new parameter called "Bearer-COUNT", before it is taken into use as the $K_{eNBi+1}$. As NH parameters are generally only computable by the UE and the Mobility Management Entity (MME), it is arranged so that NH parameters are provided to eNBs from the MME in such a way that forward security can be achieved. MME typically computes fresh {NH, NCC} pairs that is given to the target eNB.

Please note that the new parameter bearer COUNT may be used slightly differently in each embodiment.

1.1 From the Same $K_{eNB}$ (Horizontal Derivation)

Figure 10:
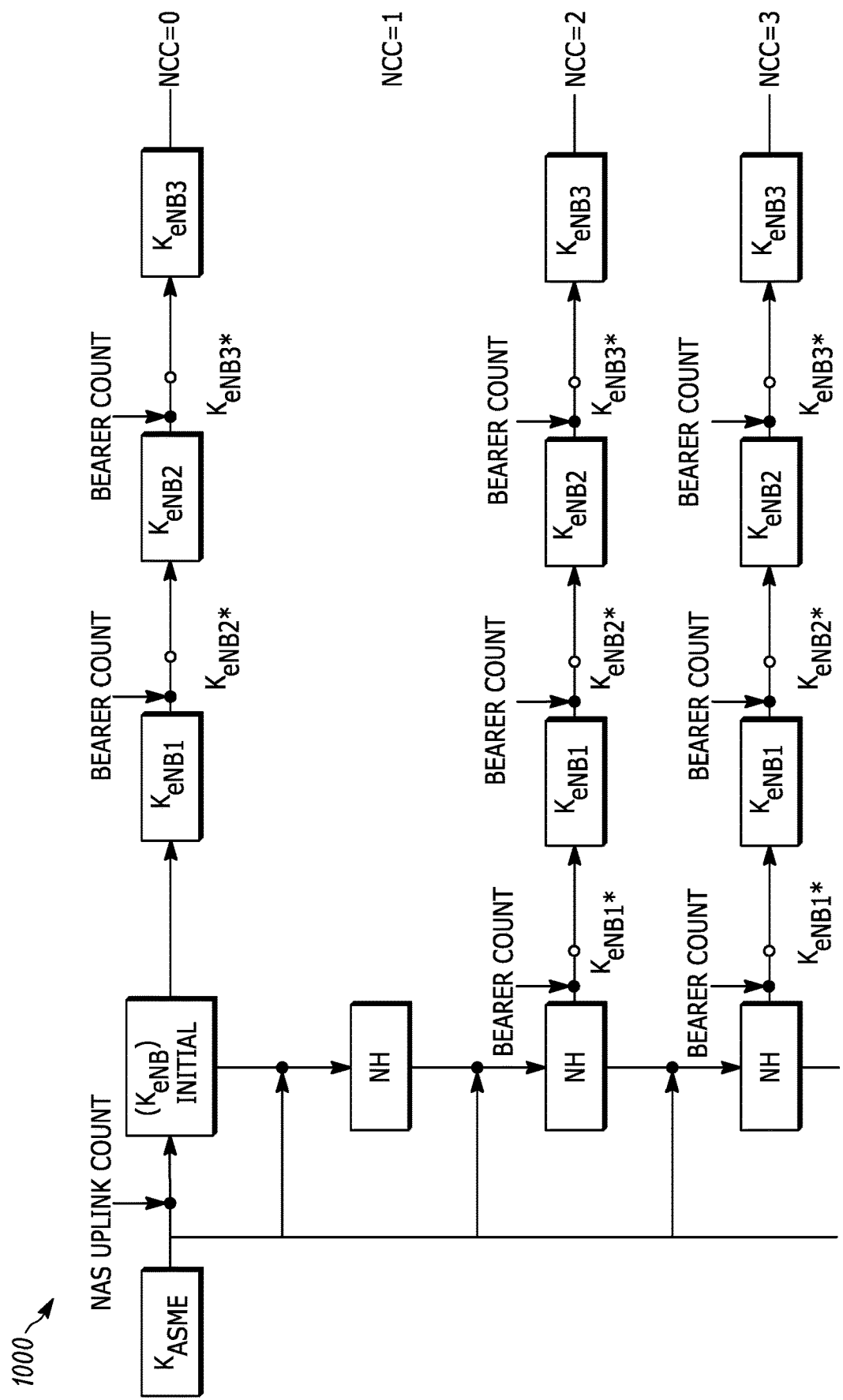
FIG. 10 is a block diagram of per bearer key derivation including horizontal and vertical.

FIG. 10 illustrates a block diagram 1000 of per bearer key derivation including horizontal and vertical.

In this method, multiple $K_{eNB}$s are derived from the same Base $K_{eNB}$. The derivation is done therefore in a "horizontal" manner. A new parameter "Bearer-COUNT" is used for deriving $K_{eNBi}$ for each Bearer. Two sub-methods are further described:

a) The per-Bearer $K_{eNBi}$ is derived from the Base Key always using a "Bearer-COUNT" which is bearer specific value. The eNB (actually a gNB in 5G NR) would choose a Bearer-COUNT value and use it to derive the per-Bearer $K_{eNBi}$ for bearer 'i' directly from the Base Key. The Bearer-COUNT is then signaled to the UE along with the configuration of the said Radio Bearer.

b) In another variation, each $K_{eNBi}$ is derived from the previous $K_{eNB}$, i.e. $K_{eNBi}$ is derived from $K_{eNBi-1}$ which in turn is derived from $K_{eNBi-2}$ and so on. The first $K_{eNBi}$ is derived directly from the Base $K_{eNB}$. A new Bearer-COUNT is used for forward security at each new $K_{eNBi}$ derivation, i.e. the Bearer-COUNT used to derive $K_{eNBi+1}$ from $K_{eNBi}$ is different from the Bearer-COUNT used to derive $K_{eNBi+2}$ from $K_{eNBi+1}$. The corresponding Bearer-COUNT(s) is then signaled to the UE along with the configuration of the said Radio bearer(s) upon a bearer addition.

A Base $K_{eNB}$ is the first $K_{eNB}$ derived directly from $K_{ASME}$ with or without a [NH, NCC] Pair, i.e. the first $K_{eNB}$ in each row in the above figure.

1.2 Using a [NH, NCC] Pair (Vertical Derivation)

In this method the $K_{eNBi}$ is derived using a vertical derivation and uses a new [NH, NCC] pair for each new Bearer (or bearer type) to be added (not depicted in the figure). If there is another new data bearer to be added, the new $K_{eNBi}$ is derived using a vertical derivation and shall use a new [NH, NCC] pair.

2. Multiple ($K_{RRCint}$, $K_{RRCenc}$ and $K_{UPenc}$, $K_{UPint}$)

In this method only one Base $K_{eNB}$ is used. However, multiple ($K_{RRCint}$, $K_{RRCenc}$ and $K_{UPenc}$, $K_{UPint}$) may be further derived from it.

Figure 11:
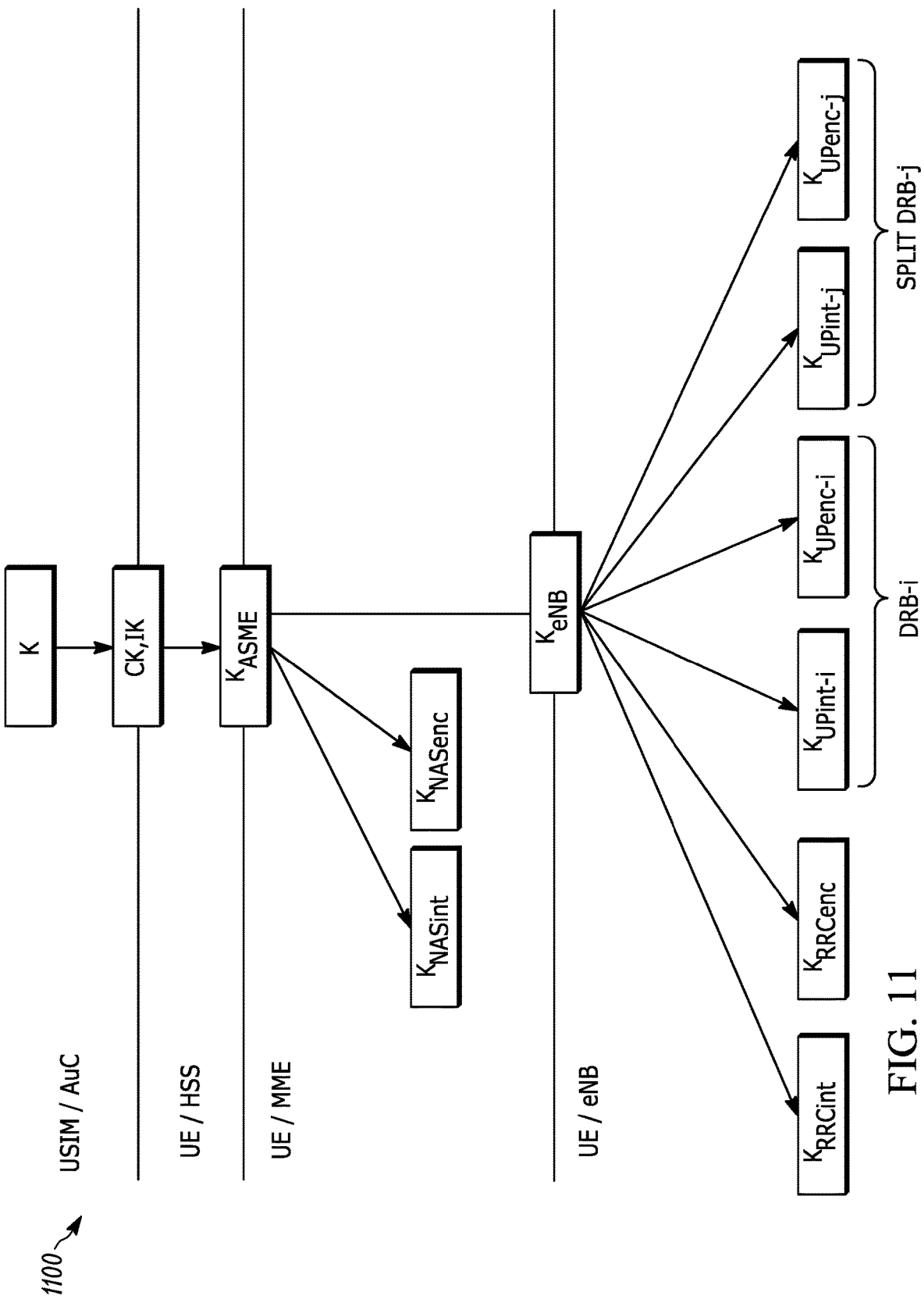
FIG. 11 is a block diagram of a key hierarchy involving multiple keys associated with a different bearer count, which are each derived from a single $K_{eNB}$.

FIG. 11 illustrates a block diagram 1100 of a key hierarchy involving multiple keys associated with a different bearer count, which are each derived from a single $K_{eNB}$.

A new parameter "Bearer-COUNT", a counter specific to each bearer, e.g. like the bearer ID, can be used to derive a particular Key. The algorithm type identifier shall distinguish which key is being generated. For example [Annex A.7 of 3GPP TS33401-e10], the Algorithm type distinguishers illustrated in FIG. 12 are used.

Figures 12, 13:
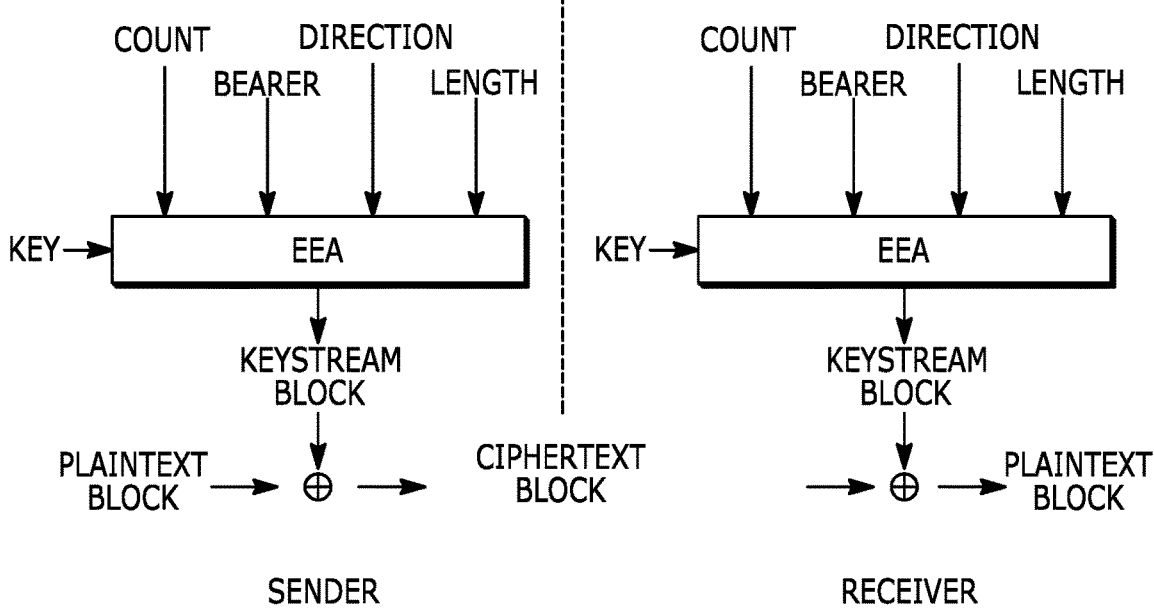
FIG. 12 is a table mapping an algorithm type distinguisher value with each one of multiple algorithms.
FIG. 13 is a block diagram for the ciphering of data, where a count value is an input of the ciphering.

FIG. 12 illustrates a table 1200, which maps an algorithm type distinguisher value with each one of multiple algorithms.

So, to generate e.g. 2 pairs of User plane keys when 2 bearers need to be established simultaneously, i.e. 2 pairs of ($K_{UPenc}$, $K_{UPint}$), 2 different Bearer-COUNT values shall be used. The corresponding Bearer-COUNT shall be sent to the UE along with their corresponding Bearer Id. When deriving keys for RRC integrity, UP integrity and for deriving RRC/UP encryption algorithms from $K_{eNB}$, in the UE, MME and eNB, the Bearer-COUNT, algorithm type distinguisher, algorithm identity and their corresponding lengths shall be used to form the string S. The eNB creates a corresponding mapping between the Bearer-COUNT and the Bearer identity and signals the same to the UE. In one possible embodiment, the Bearer identity may itself be used as a part of or as the Bearer-COUNT.

Refresh/Change of Keys for One Bearer (e.g. Count Wrap-Around)

Figure 14A:
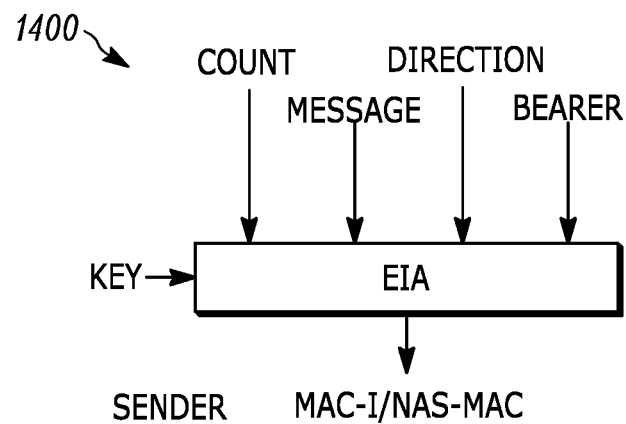
FIGS. 14A and 14B are block diagrams for the derivation of integrity protection signaling involving a count value is an input of the derivation, where FIG. 14A highlights the derivation for a sender, and FIG. 14B highlights the derivation for a receiver.
Figure 14B:
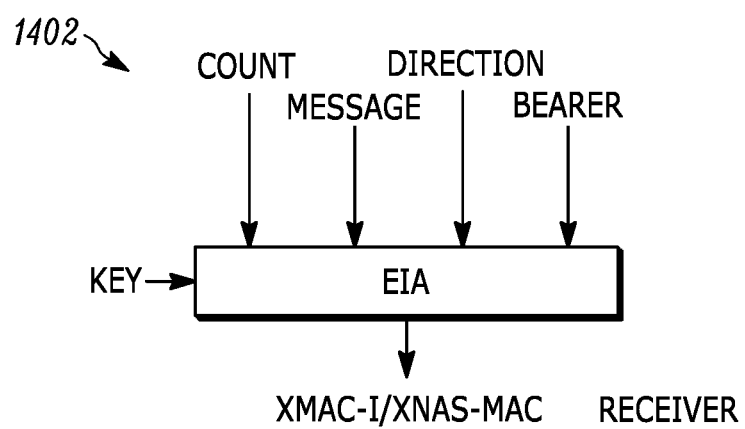

There are occasion such as but not limited to COUNT wrap-around where the keys for ciphering and integrity protection of a Bearer should be changed. The "COUNT" is an input in the actual ciphering and integrity protection as shown in FIG. 13, and FIGS. 14A and 14B.

FIG. 13 illustrates a block diagram 1300 of a ciphering of data, where a count value is an input of the ciphering. FIGS. 14A and 14B illustrate block diagrams 1400 and 1402 of a derivation of integrity protection signaling involving a count value is an input of the derivation, where FIG. 14A highlights the derivation for a sender, and FIG. 14B highlights the derivation for a receiver.

For each radio bearer an independent counter (COUNT, as specified in 3GPP TS 36.323-e10) is maintained for each direction. For each DRB, the COUNT is used as input for ciphering. For each SRB, the COUNT is used as an input for both ciphering and integrity protection. It is generally not allowed to use the same COUNT value more than once for a given security key. At connection resume the COUNT is reset. In order to limit the signaling overhead, individual messages/packets include a short sequence number (PDCP Sequence Number (SN), as specified in TS 36.323). In addition, an overflow counter mechanism is used: the hyper frame number (Transmit Hyper Frame Number (TX_HFN) and Receive Hyper Frame Number (RX_HFN), as specified in TS 36.323). The HFN needs to be synchronized between the UE and the eNB. The eNB is responsible for avoiding reuse of the COUNT with the same Resource Block (RB) identity and with the same $K_{eNB}$, such as due to the transfer of large volumes of data, release and establishment of new RBs. In order to avoid such re-use, the eNB may, e.g. use different RB identities for successive RB establishments, trigger an intra cell handover or an RRC CONNECTED to RRC IDLE to RRC CONNECTED transition. An intra cell handover or an RRC CONNECTED to RRC IDLE to RRC CONNECTED transition may have the problem of data loss since in both cases the layer 2 (PDCP, RLC, MAC) need to be Re-established or Reset for the radio bearers involved. The per-bearer key concept allows the keys to be refreshed/changed for the particular Bearers in question. How the Bearer specific key can be refreshed depends on the method used to generate keys for the bearer in the first place.

In case of "Multiple $K_{eNB}$ derivation", the refresh mechanism shall generate one new $K_{eNBi+1}$ (when keys for one of the Bearer Id in use from '0' to T needs to be refreshed). For this purpose, a new Bearer-COUNT shall be used by the eNB, and the same would be signaled to the UE along with the Bearer Id for the Bearer for which the Keys are being refreshed. The Bearer Id itself could be kept as is or could be reconfigured/updated to a new value. The procedure may look like a Bearer re-establishment or a Bearer deletion+addition.

In case of "Multiple $K_{RRCint}$, $K_{RRCenc}$ and $K_{UPenc}$, $K_{UPint}$) derivation", the refresh mechanism shall typically generate one pair of user plane ($K_{UPenc}$, $K_{UPint}$) keys from the Bearer-COUNT, as described above if keys for a certain DRB needs to be refreshed.

Refresh/Change of Keys for all Bearers, Such as in a Handover Situation

Figure 15:
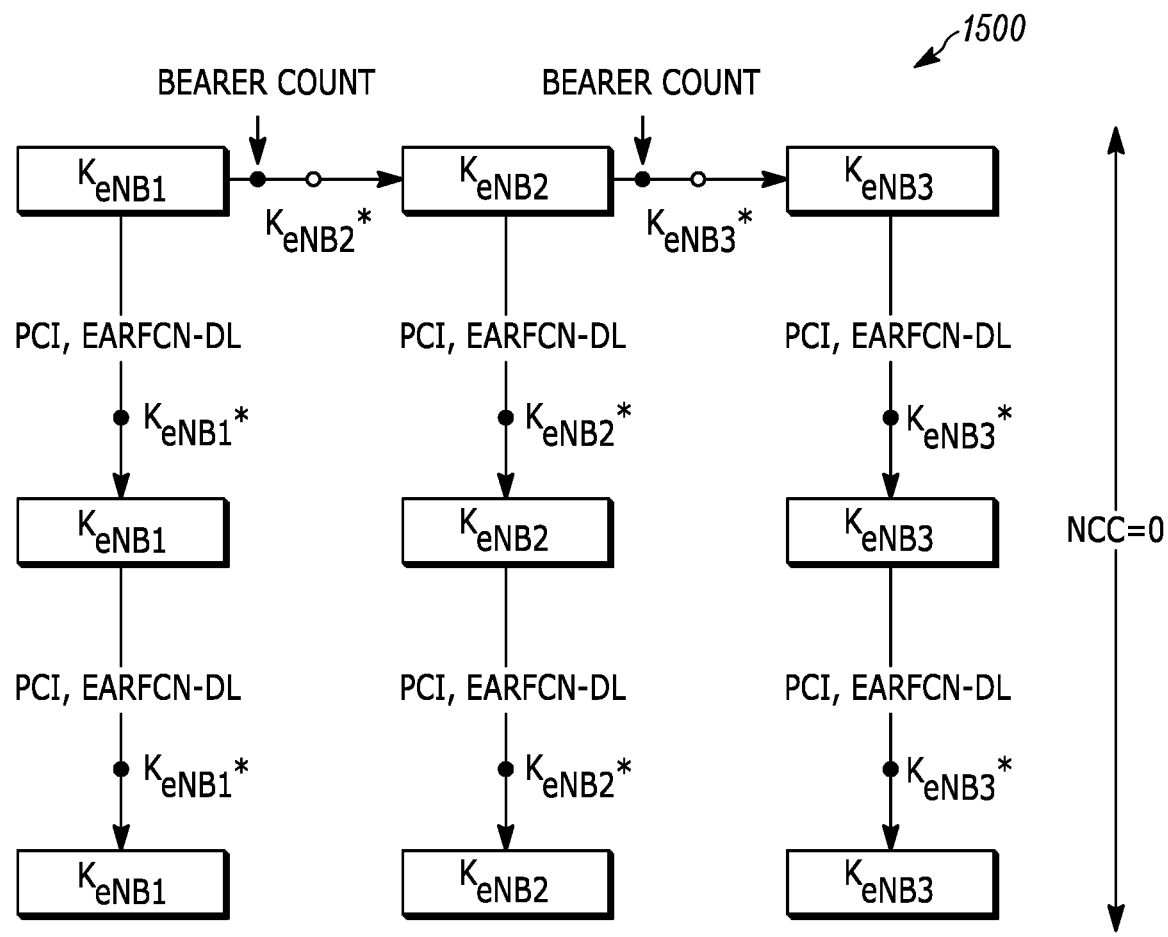
FIG. 15 is a block diagram of horizontal key derivation for handover scenarios, such as from Physical Cell Identity (PCI), Evolved Absolute Radio Frequency Channel Number-Downlink (EARFCN-DL)

Handover and some other procedures might require keys for all Bearers changed at the same time. In case of Multiple $K_{eNB}$ derivation, in one embodiment, this could be done in the horizontal way, as shown in FIG. 15, below, i.e. without changing the current NCC value. In FIG. 15, the $K_{eNB1}$, $K_{eNB2}$, $K_{eNB3}$ are being used corresponding to say Bearers 1, 2 and 3 respectively. Then after handover, the new keys for the Bearers 1, 2 and 3 respectively can be derived from currently active $K_{eNB}$ and the target PCI and its frequency EARFCN-DL.

A NCC value is signalled to the UE e.g. in the Handover (HO) command message. If the NCC value the UE received in the HO Command message from target eNB via source eNB is equal to the NCC value associated with the currently active $K_{eNBi}$, the UE shall derive the $K_{eNBi}$* from the currently active $K_{eNBi}$ and the target PCI and its frequency Evolved Absolute Radio Frequency Channel Number (EARFCN-DL).

If the UE received an NCC value that was different from the NCC associated with the currently active $K_{eNBi}$, the UE shall first synchronize the locally kept NH parameter by computing the function defined in Annex A.4 (of 3GPP TS33401-e10), iteratively, and increasing the NCC value until it matches the NCC value received from the source eNB via the Handover (HO) command message. When the NCC values match, the UE shall compute the $K_{eNBi}$* from the synchronized NH parameter and the target PCI and its frequency EARFCN-DL using the function defined in Annex A.5 (of 3GPP TS33401-e10).

The UE shall use the $K_{eNBi}$* as the $K_{eNBi}$ when communicating with the target eNB.

FIG. 15 illustrates a block diagram 1500 of horizontal key derivation for handover scenarios, such as from Physical Cell Identity (PCI), Evolved Absolute Radio Frequency Channel Number-Downlink (EARFCN-DL).

When using "Multiple ($K_{RRCint}$, $K_{RRCenc}$ and $K_{UPenc}$, $K_{UPint}$) derivation", a new KeNB can be derived. Subsequently, the multiple pairs of ($K_{RRCint}$, $K_{RRCenc}$ and $K_{UPenc}$, $K_{UPint}$) can be derived by resetting the Bearer-COUNT and using different values for each Bearer to be established. The used Bearer-COUNTs together with the corresponding Bearer configuration are sent to the UE from the target eNB (via the source eNB).

In one further embodiment, the Bearer-COUNT from any of the methods/embodiments can be the Bearer-ID of the corresponding Bearer. In further possibility, Bearer-COUNT could be an integer value of a certain range, such as 0-32.

When the Bearer-COUNT values are exhausted, a next (UP) level key refresh could be performed, such as using an Intra cell Handover procedure as defined in 3GPP TS36331-e10 refreshing $K_{eNB}$ or any other key above in the hierarchy.

At least one aspect of the present disclosure allows for the generation of end keys used for actual ciphering and integrity protection of control and user plane data per bearer, per bearer-type, or a combination of both. The per-bearer keys can be generated for data plane and/or control plane (i.e. DRBs as well as SRBs). This shall allow for and facilitate security isolation of one Bearer from the other and also allow changing/refreshing of keys for one or some Bearer(s) at a time—while reducing the need to change/refresh keys for all the Bearers, and thereby allowing the other Bearer(s) to continue data transmission and reception with less possibility of interruption.

Figure 16:
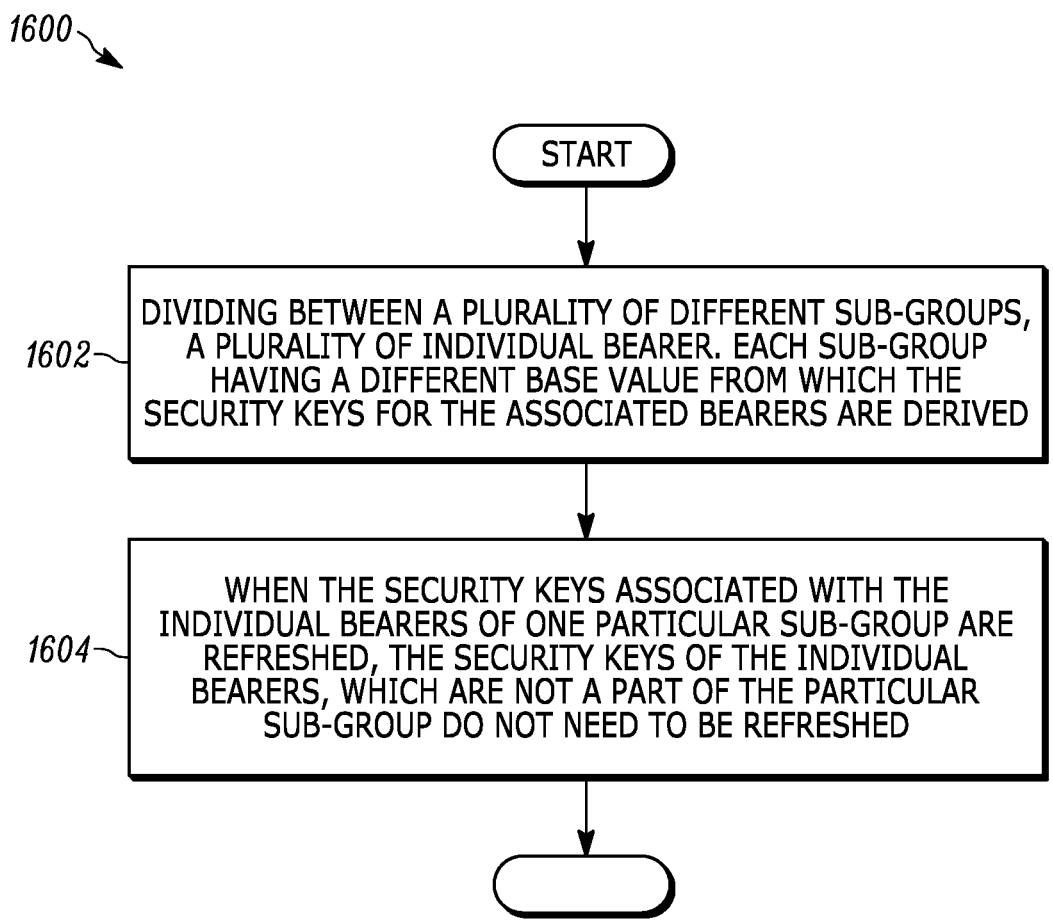
FIG. 16 is a flow diagram of a method in a user equipment for handling security keys for individual bearers of the user equipment.

FIG. 16 illustrates a flow diagram 1600 of a method in a user equipment for handling security keys for individual bearers of the user equipment. The method includes dividing 1602 between a plurality of different sub-groups, a plurality of individual bearers, each sub-group having a different base value from which the security keys for the associated bearers are derived. When the security keys associated with the individual bearers of one particular sub-group are refreshed, the security keys of the individual bearers, which are not a part of the particular sub-group do not need to be refreshed 1604.

In at least some instances, the plurality of different sub-groups can include bearers which distinguish between a type of information being conveyed by the bearer including control information and data information. It is also possible, that in some instances, the plurality of different sub-groups can include bearers which distinguish between a type of connectivity between multiple networks which is supported by the bearer including a master cell group bearer supporting connectivity with a master cell, a secondary cell group bearer supporting connectivity with a secondary cell, and a split cell group bearer supporting connectivity with both the master cell and the secondary cell. In some instances, the security keys of the individual bearers can include a security key for supporting data encryption, and a security key for verifying integrity of the signaling. In these or other instances, the security keys associated with each of the individual bearers can be one of user plane keys or control plane keys. In some instances, each of the different respective base values used with each of the different sub-groups can be derived from a common source value. It is possible that each of the individual bearers can be associated with a different respective one of the plurality of different sub-groups. It is further possible that the plurality of different sub-groups can include a sub-group for master cell group bearers, a sub-group for secondary cell group bearers, and a sub-group for split cell group bearers.

Figure 17:
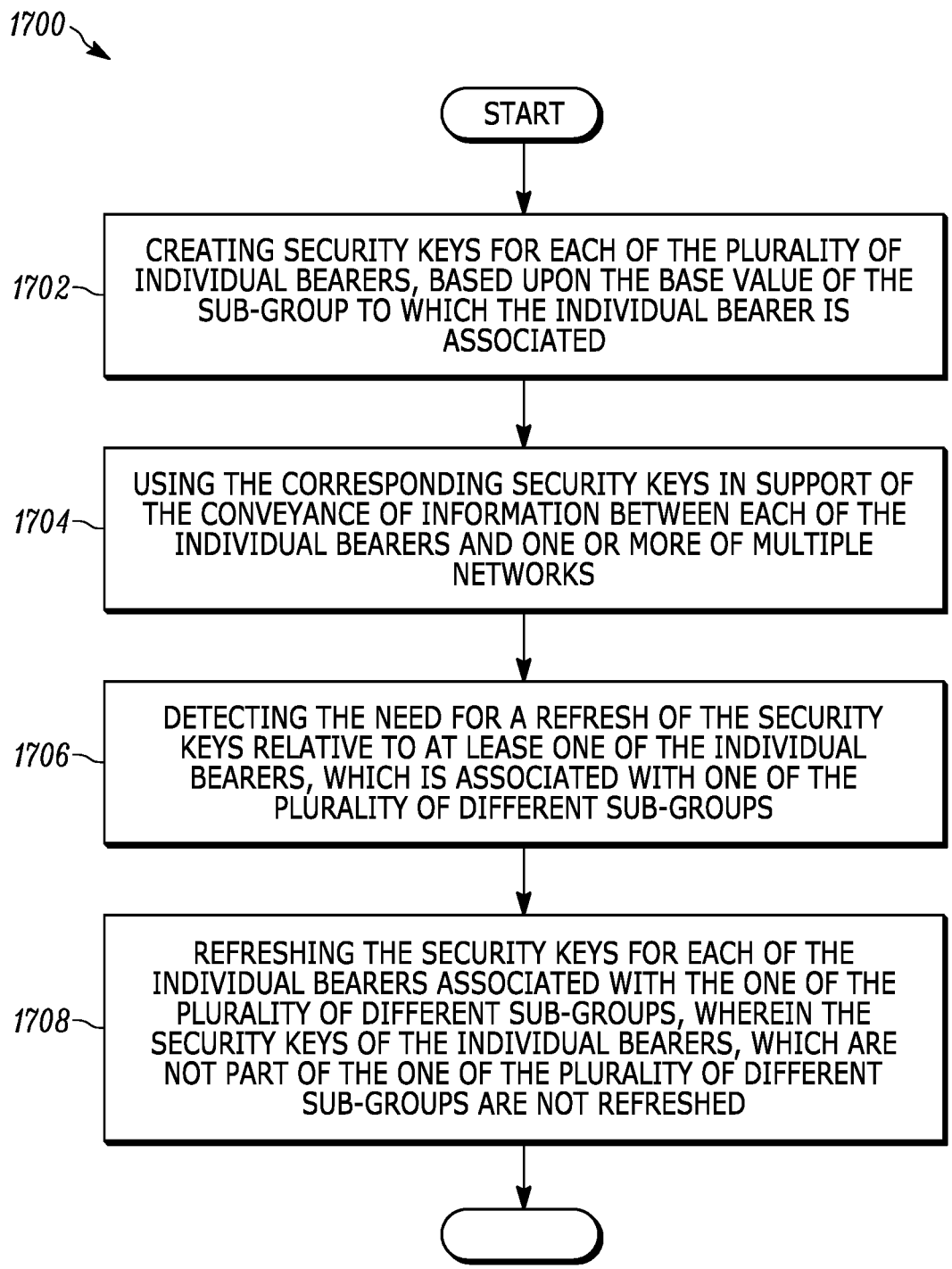
FIG. 17 is a flow diagram highlighting the creation and refreshing of security keys for each of a plurality of different sub-groups.

FIG. 17 illustrates a flow diagram 1700 highlighting the creation and refreshing of security keys for each of a plurality of different sub-groups, which can include creating 1702 security keys for each of the plurality of individual bearers, based upon the base value of the sub-group to which the individual bearer is associated. The corresponding security keys are then used 1704 in support of the conveyance of information between each of the individual bearers and one or more of multiple networks. The need for a refresh of the security keys relative to at least one of the individual bearers, which is associated with one of the plurality of different sub-groups can then be detected 1706. The security keys for each of the individual bearers associated with the one of the plurality of different sub-groups can then be refreshed 1708, wherein the security keys of the individual bearers, which are not part of the one of the plurality of different sub-groups are not refreshed.

In some instances, the conveyance of information between each of the individual bearers and the one or more of multiple networks can include a count value, which is used as an input for at least one of the ciphering and integrity protection relative to the security keys; and wherein detecting the need for a refresh of the security keys relative to at least one of the individual bearers includes detecting a count wrap-around. In some of these instances, the count value associated with a particular bearer can be associated with a bearer having an identity value, where the identity value can be used with the count value to distinguish between the different count values, which are each associated with a respective one of the bearers. In some instances, detecting the need for a refresh of the security keys relative to at least one of the individual bearers can include detecting the need for a handover.

Figure 18:
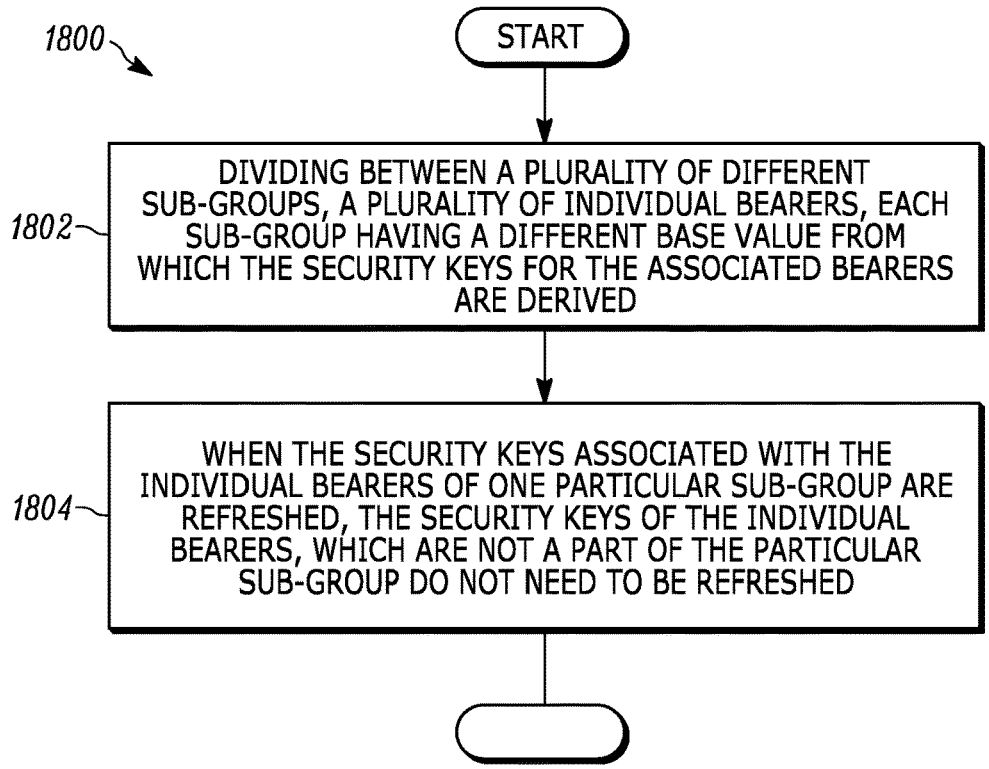
FIG. 18 is a flow diagram of a method in a network entity for handling security keys for individual bearers of the user equipment.

FIG. 18 illustrates a flow diagram 1800 of a method in a network entity for handling security keys for individual bearers of the user equipment. The method includes dividing 1802 between a plurality of different sub-groups, a plurality of individual bearers, each sub-group having a different base value from which the security keys for the associated bearers are derived. When the security keys associated with the individual bearers of one particular sub-group are refreshed, the security keys of the individual bearers, which are not a part of the particular sub-group do not need to be refreshed 1804.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 19:
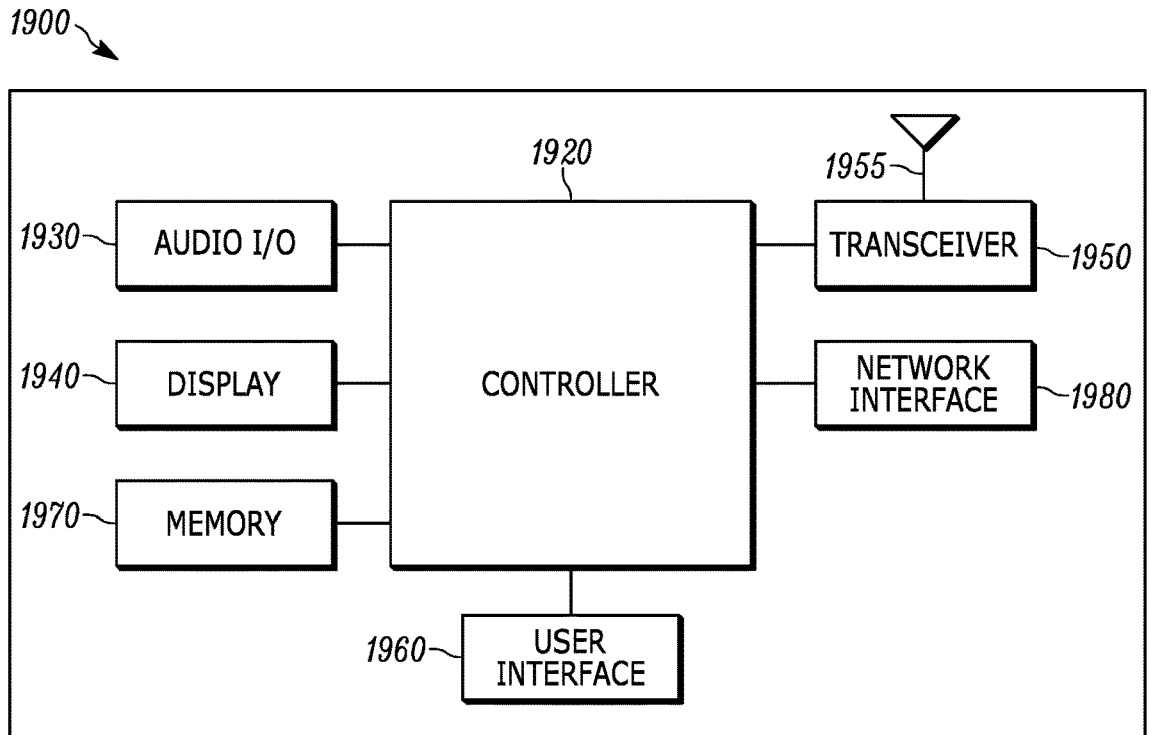
FIG. 19 is an example block diagram of an apparatus according to a possible embodiment.

FIG. 19 is an example block diagram of an apparatus 1900, such as the wireless communication device 110, according to a possible embodiment. The apparatus 1900 can include a housing 1910, a controller 1920 within the housing 1910, audio input and output circuitry 1930 coupled to the controller 1920, a display 1940 coupled to the controller 1920, a transceiver 1950 coupled to the controller 1920, an antenna 1955 coupled to the transceiver 1950, a user interface 1960 coupled to the controller 1920, a memory 1970 coupled to the controller 1920, and a network interface 1980 coupled to the controller 1920. The apparatus 1900 can perform the methods described in all the embodiments The display 1940 can be a viewfinder, a liquid crystal display (LCD), a light emitting diode (LED) display, a plasma display, a projection display, a touch screen, or any other device that displays information. The transceiver 1950 can include a transmitter and/or a receiver. The audio input and output circuitry 1930 can include a microphone, a speaker, a transducer, or any other audio input and output circuitry. The user interface 1960 can include a keypad, a keyboard, buttons, a touch pad, a joystick, a touch screen display, another additional display, or any other device useful for providing an interface between a user and an electronic device. The network interface 1980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1970 can include a random access memory, a read only memory, an optical memory, a solid state memory, a flash memory, a removable memory, a hard drive, a cache, or any other memory that can be coupled to an apparatus.

The apparatus 1900 or the controller 1920 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1970 or elsewhere on the apparatus 1900. The apparatus 1900 or the controller 1920 may also use hardware to implement disclosed operations. For example, the controller 1920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1920 may be any controller or processor device or devices capable of operating an apparatus and implementing the disclosed embodiments. Some or all of the additional elements of the apparatus 1900 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a particular user equipment for handling security keys for a plurality of individual bearers of the particular user equipment, the method comprising:

dividing between a plurality of different sub-groups within the particular user equipment, the plurality of individual bearers of the particular user equipment, each sub-group having a different base value from which the security keys for the associated individual bearers are derived;

wherein, when the security keys associated with the individual bearers of one particular sub-group are refreshed, the security keys of the individual bearers, which are not a part of the particular sub-group do not need to be refreshed.

2. A method in accordance with claim 1, wherein the plurality of different sub-groups include bearers which distinguish between a type of information being conveyed by the bearer including control information and data information.

3. A method in accordance with claim 1, wherein the plurality of different sub-groups include bearers which distinguish between a type of connectivity between multiple networks which is supported by the bearer including a master cell group bearer supporting connectivity with a master cell, a secondary cell group bearer supporting connectivity with a secondary cell, and a split cell group bearer supporting connectivity with both the master cell and the secondary cell.

4. A method in accordance with claim 1, wherein the security keys of the individual bearers include a security key for supporting data encryption, and a security key for verifying integrity of the signaling.

5. A method in accordance with claim 1, wherein the security keys associated with each of the individual bearers are one of user plane keys or control plane keys.

6. A method in accordance with claim 1, wherein each of the different respective base values used with each of the different sub-groups are derived from a common source value.

7. A method in accordance with claim 1, wherein each of the individual bearers is associated with a different respective one of the plurality of different sub-groups.

8. A method in accordance with claim 1, wherein the plurality of different sub-groups include a sub-group for master cell group bearers, a sub-group for secondary cell group bearers, and a sub-group for split cell group bearers.

9. A method in accordance with claim 1, wherein the plurality of different sub-groups include a sub-group for master cell group bearers conveying control information, a sub-group for master cell group bearers conveying data information, a sub-group for secondary cell group bearers conveying control information, a sub-group for secondary cell group bearers conveying data information, a sub-group for split cell group bearers conveying control information, and a sub-group for split cell group bearers conveying data information.

10. A method in accordance with claim 1, wherein the plurality of different sub-groups include a sub-group for master cell group bearers and secondary cell group bearers, and a sub-group for split cell group bearers.

11. A method in accordance with claim 1 further comprising:
creating security keys for each of the plurality of individual bearers, based upon the base value of the sub-group to which the individual bearer is associated;
using the corresponding security keys in support of the conveyance of information between each of the individual bearers and one or more of multiple networks;
detecting the need for a refresh of the security keys relative to at least one of the individual bearers, which is associated with one of the plurality of different sub-groups; and
refreshing the security keys for each of the individual bearers associated with the one of the plurality of different sub-groups, wherein the security keys of the individual bearers, which are not part of the one of the plurality of different sub-groups are not refreshed.

12. A method in accordance with claim 11, wherein the conveyance of information between each of the individual bearers and the one or more of multiple networks includes a count value, which is used as an input for at least one of the ciphering and integrity protection relative to the security keys; and wherein detecting the need for a refresh of the security keys relative to at least one of the individual bearers includes detecting a count wrap-around.

13. A method in accordance with claim 12, wherein the count value associated with a particular bearer is associated with a bearer having an identity value, where the identity value can be used with the count value to distinguish between the different count values, which are each associated with a respective one of the bearers.

14. A method in accordance with claim 11, wherein detecting the need for a refresh of the security keys relative to at least one of the individual bearers includes detecting the need for a handover.

15. A particular user equipment having dual connectivity with at least a pair of communication networks, the particular user equipment comprising:
a controller that establishes a plurality of individual bearers of the particular user equipment and organizes them between a plurality of different sub-groups within the particular user equipment, each sub-group having a different base value from which security keys for the associated individual bearers are derived;
wherein, when the security keys associated with the individual bearers of one particular sub-group are refreshed, the security keys of the individual bearers, which are not a part of the particular sub-group do not need to be refreshed.

16. A particular user equipment in accordance with claim 15, wherein the controller creates security keys for each of the plurality of individual bearers, based upon the base value of the sub-group to which the individual bearer is associated.

17. A particular user equipment in accordance with claim 16 further comprising a transceiver that uses the corresponding security keys in support of the conveyance of information between each of the individual bearers and one or more of multiple networks.

18. A particular user equipment in accordance with claim 17 wherein the transceiver conveys to at least one of the at least pair of communication networks parameter values used to create the security keys for each of the bearers.

19. A particular user equipment in accordance with claim 15, wherein the controller detects the need for a refresh of the security keys relative to at least one of the individual bearers, which is associated with one of the plurality of different sub-groups; and refreshes the security keys for each of the individual bearers associated with the one of the plurality of different sub-groups, wherein the security keys of the individual bearers, which are not part of the one of the plurality of different sub-groups are not refreshed.

20. A particular user equipment in accordance with claim 19, wherein as part of detecting the need for a refresh, the controller one or more of (a) detects a count wrap-around, where a respective count value is associated with information being conveyed between each of the individual bearers and the one or more multiple networks, or (b) detects the need for a handover.

* * * * *